W. W. UNDERWOOD.
METALLIC SNIP.
APPLICATION FILED DEC. 16, 1919.
1,368,077.
Patented Feb. 8, 1921.
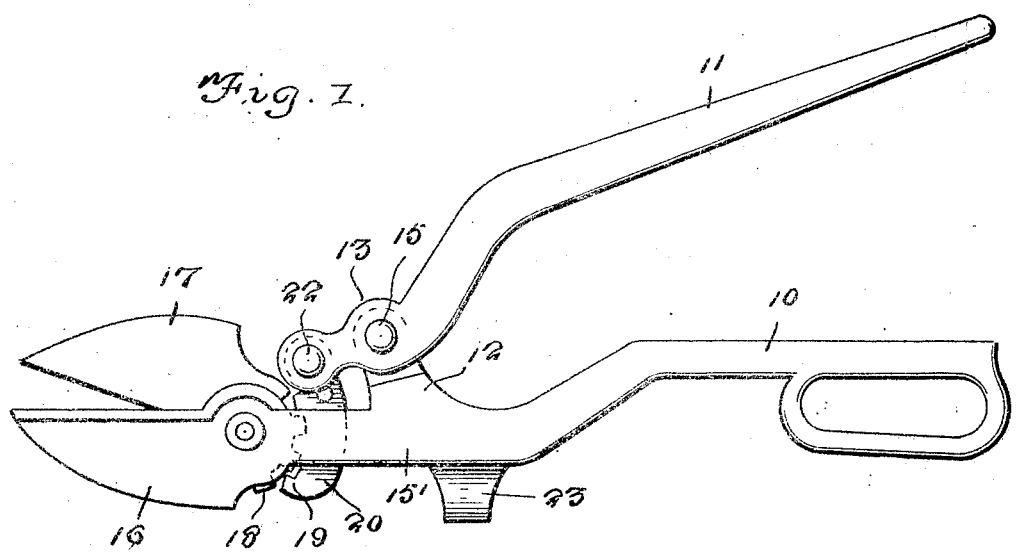
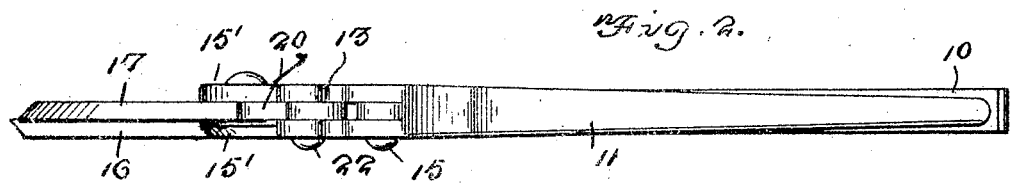
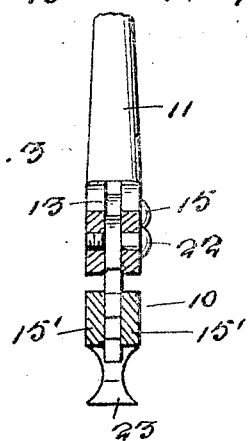
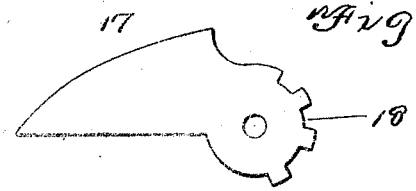
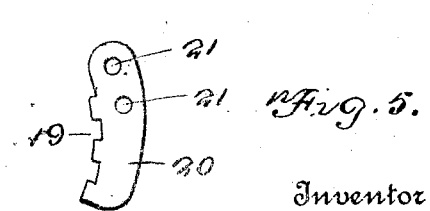
Inventor
W. W. Underwood
By Victor J. Evans
Attorney

UNITED STATES PATENT OFFICE.

WILLIAM W. UNDERWOOD, OF ST. LOUIS, MISSOURI.

METALLIC SNIP.

1,368,077.  Specification of Letters Patent.  Patented Feb. 8, 1921.

Application filed December 16, 1919. Serial No. 345,274.

*To all whom it may concern:*

Be it known that I, WILLIAM W. UNDERWOOD, a citizen of the United States, residing at St. Louis, in the State of Missouri, have invented new and useful Improvements in Metallic Snips, of which the following is a specification.

This invention comprehends the provision of a pair of metallic snips designed to be used with the least effort to cut through relatively thick metal and a guide being carried by one handle of the snip and disposed to follow in the cut made by the snip to insure cutting the material along a straight line.

The nature and advantages of the invention will be better understood when the following detail description is taken in connection with the accompanying drawings, the invention residing in the construction, combination and arrangement of parts as claimed.

In the drawings forming part of this specification like numerals of reference indicate similar parts in the several views and wherein:—

Figure 1 is a side elevation of the snips constructed in accordance with my invention.

Fig. 2 is an edge elevation.

Fig. 3 is a sectional view taken on the line 3—3 of Fig. 1.

Fig. 4 is a detail view of the movable blade.

Fig. 5 is a similar view of the operating means therefor.

Referring to the drawings in detail, the snips comprise the handles 10 and 11 respectively which may be of any suitable design. The lug 12 projects from the handle 10 and is received within the slot 13 of the handle 11. The pivot 15 connects the handle 11 and the lug 12 and permits movement of the handle 11 toward and away from the handle 10. The handle 10 is bifurcated at one end, and one of the separated portions 15 defined by said bifurcation is extended beyond the other of said separated portions to provide a fixed cutting blade 16. Fitted between the separated portions 15 of the bifurcated end of the handle 10, and pivoted for movement toward and away from the fixed blade, is a movable cutting blade 17. The pivoted end of this blade is substantially circular in outline and provided with teeth 18 which mesh with the teeth 19 of an operating link 20. The link is pivoted within the slot 13 of the handle 11 and projects at a substantially right angle from this handle for sliding movement to the bifurcated extremity of the handle 10 for operative association with the movable blade 17. It will be noted, that the link 20 is provided with a plurality of openings 21, through any one of which the pivots 22 may be passed to vary the leverage of the handle 11. By reason of the construction and arrangement disclosed, it is apparent that the snips may be used with a minimum of effort for cutting relatively thick metal, thus rendering the snips susceptible for use by those who have not a particularly strong grip.

For the purpose of insuring cutting of the material along a straight line, I provide a guide 23 which is arranged to project from the handle 10 in alinement with the space between the separated portions 15 thereof. The guide 23 has its opposite side curved in a direction to provide relatively thin intermediate portions and a broad end portion. By reason of this construction the guide cannot be readily or casually moved from the cut made by the snips during the use of the latter, it being understood that the guide is adapted to travel in the cut made by the snip to hold the blade in a straight line for the purpose stated. The snips are simple in construction and can be conveniently handled for the purposes mentioned.

While I have shown and described the preferred embodiment of the invention I desire to have it understood that I do not limit myself to the exact arrangement herein shown, and that such changes may be resorted to when desired as fall within the scope of what is claimed.

Having thus described my invention what I claim as new is:—

A pair of snips of the character described comprising pivoted handles, a fixed cutting blade carried by one of the handles, a movable cutting blade pivoted upon said handle, said movable blade having a plurality of teeth, an operating link having teeth engaging the teeth of the movable blade, said link being disposed at a right angle to the other of said handles and pivotally associated therewith whereby the movable blade is controlled by the latter mentioned handle for direction toward and away from the fixed blade.

In testimony whereof I affix my signature.

WILLIAM W. UNDERWOOD.